United States Patent [19]

Pan

[11] Patent Number: 5,276,747
[45] Date of Patent: Jan. 4, 1994

[54] POLARIZATION-INDEPENDENT OPTICAL SWITCH/ATTENUATOR

[75] Inventor: Jing-Jong Pan, Milpitas, Calif.

[73] Assignee: E-Tek Dynamics, Inc., San Jose, Calif.

[21] Appl. No.: 6,889

[22] Filed: Jan. 21, 1993

[51] Int. Cl.$^5$ ............................................. G02B 6/32
[52] U.S. Cl. ...................................... 385/34; 359/36
[58] Field of Search ............... 385/31, 33, 34; 359/63, 359/315, 350, 352, 355, 362, 36, 37, 39, 41, 42

[56] References Cited

U.S. PATENT DOCUMENTS

| | | | |
|---|---|---|---|
| 4,239,329 | 12/1980 | Matsumoto | 385/33 X |
| 4,398,791 | 8/1983 | Dorsey | 385/33 X |
| 4,842,360 | 6/1989 | Caro et al. | 385/33 |
| 4,893,890 | 1/1990 | Lutes | 385/33 X |
| 5,071,232 | 12/1991 | Kato et al. | 385/33 |
| 5,163,107 | 11/1992 | Garriss | 385/34 X |

*Primary Examiner*—Akm E. Ullah
*Attorney, Agent, or Firm*—Townsend and Townsend Khourie and Crew

[57] ABSTRACT

An optical device which controls the strength of an optical signal from an input fiber to an output fiber responsive to a signal on a control terminal. The device has a first GRIN lens associated with the input fiber, a first birefringent polarizer, a liquid crystal cell, a second birefringent polarizer and a second GRIN lens associated with the output fiber. The liquid crystal cell, located between the first and second polarizers and connected to a control terminal, controllably rotates the optical signal from the optical axis of the first polarizer toward the optical axis of the second polarizer responsive to the signal on said control terminal. The operation of the device is independent of the polarization of the optical signal in the input fiber. Furthermore, the device can be operated as an optical switch or an optical attenuator by suitably arranging the axes of the polarizers and liquid crystal cell.

21 Claims, 4 Drawing Sheets

POLARIZATION-INDEPENDENT OPTICAL SWITCH/ATTENUATOR

BACKGROUND OF THE INVENTION

The present invention relates to optical fiber technology and, more particularly, to optical devices useful in fiber optic networks, such as optical switches and optical attenuators.

Complex electronic systems such as required for ground and space control, command, radio/data transmission, sensor rays, telecommunications and networks, require high performance switches for switching matrices. Heretofore, most conventional electrical or electrical mechanical switching matrices have had shortcomings of large thermal effects and heat problems, large size, weight, cost in power consumption, narrow operational bandwidth and susceptibility to electromagnetic interference, electromagnetic pulses or RF interference.

Thus many communications and control systems have migrated to fiber optic or electro-optical systems to avoid many of these problems, such as electromagnetic interference, electromagnetic pulse, or RF interference immunity, and to reduce the size, weight and cost of elements in these systems. However, current fiber optic or electro-optic switches still have various disadvantages. For example, commercially available fiber optic switches are 1×2 or are 2×2 configurations. However, these switches have certain problems including, large physical size, high cost, poor reliability due to the movement of mechanical parts within the switch. Furthermore, these types of switches make it difficult to construct a micro-miniature switching matrix because the switches require mechanical mountings in various fiber optic interconnections and splicings. Furthermore, these optical switches have slow switching speeds and consume large amounts of power to move the mechanical parts which, in turn, results in undesirably large heat generation.

Another example is a deflection type switch which has liquid crystal, electro-optic lithium niobate (LiNbO$_3$), or acoustic optic crystal. These do not have the disadvantages of the aforementioned opto-mechanical fiber optic switches. Furthermore, these switches can operate at high (picosecond) switching speeds. However, these switches require complex fabrication processes which result in high cost and difficulty in manufacturing a switching array. Furthermore, performance shortcomings include high insertion loss and poor immunity from crosstalk.

Another type of switch, the liquid crystal shutter switch, avoids many of the problems of electro-optical switch and the deflection type switch. This type of switch can easily be combined to form a switching matrix or switch array. However, a disadvantage of this type of switch is that it is sensitive to the polarization of the incoming light signal and may have up to 3 dB insertion loss.

The present invention solves or substantially mitigates the problems of the liquid crystal shutter switch while retaining its many advantages.

SUMMARY OF THE INVENTION

The present invention provides for an optical device which controls the strength of an optical signal from an input fiber to an output fiber responsive to a signal on a control terminal. The device has a first GRIN lens associated with the input fiber, a first birefringent polarizer, a liquid crystal cell, a second birefringent polarizer and a second GRIN lens associated with the output fiber.

The first GRIN lens is arranged to collimate the optical signal from the input optical fiber toward the first polarizer. The first birefringent polarizer has an optical axis perpendicular to a line of travel from the collimated optical signal from the first GRIN lens and splits the optical signal into two polarization modes. The second birefringent polarizer has an optical axis which is perpendicular to the line of travel from the collimated optical signal from the first GRIN lens and offset from the optical axis of the first polarizer by a predetermined angle. The second GRIN lens is arranged to recollimate the optical signal from the second polarizer to the output fiber.

Finally the liquid crystal cell, located between the first and second polarizers and connected to the control terminal, controllably rotates the optical signal from the optical axis of the first polarizer toward the optical axis of the second polarizer responsive to the signal on said control terminal.

The operation of the device is independent of the polarization of the optical signal in the input fiber. Furthermore the device can be operated as an optical switch or an optical attenuator by suitably arranging the axes of the polarizers and liquid crystal cell.

BRIEF DESCRIPTION OF THE DRAWINGS

FIG. 4A is a generalized ray tracing of an optical signal through the first and second polarizers and the liquid crystal cell of the switch when the liquid crystal cell is turned on.

DETAILED DESCRIPTION OF PREFERRED EMBODIMENTS

Figure 1:
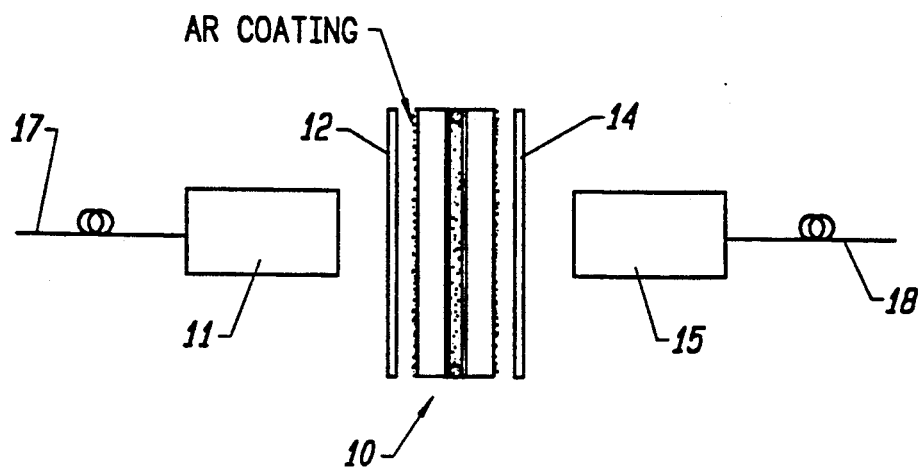
FIG. 1 is a cross-sectional view of a present-day liquid crystal shutter switch.

FIG. 1 is a representational cross-sectional diagram of a conventional liquid crystal, fiber optic shutter switch. In response to a control signal on an input terminal (not shown) the switch either passes or blocks an input optical signal from the input fiber 17 to the output fiber 18. The typical elements of this conventional type of liquid crystal shutter switch include first and second GRIN lens 11 and 15, respectively, and first polarizer 12, a second polarizer 14, sometimes called an analyzer, and a liquid crystal cell 10 between the first and second polarizers 12 and 14.

As noted above, this type of optical switch has a problem in that the performance of the switch is highly dependent upon the polarization of the optical signal from the input fiber 17. Insertion losses can be greater than 3 dB, which is highly undesirable.

The present invention provides for an optical switch having a performance independent of the polarization of the input optical signal. Such polarization independence is found in an optical fiber isolator, as described in the applicant's commonly assigned patent application, U.S. Ser. No. 07/786,434, entitled, "AN IMPROVED OPTICAL ISOLATOR," filed Nov. 1, 1991 by the present inventor and assigned to the present assignee. The present invention adapts some of the features of the optical isolator to achieve performance which is polarization independent.

Figure 2:
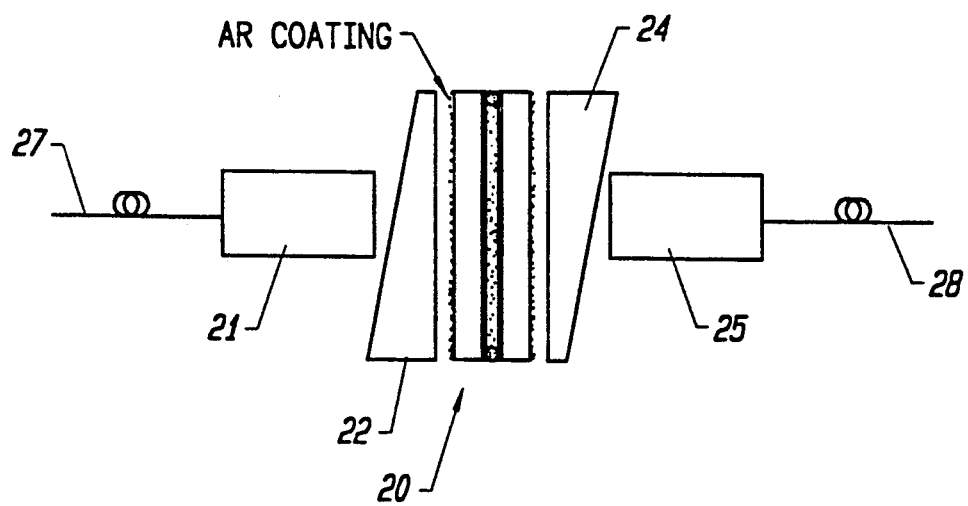
FIG. 2 is a cross-sectional view of the improved liquid crystal shutter switch/attenuator according to the present invention.

FIG. 2 is a representational drawing which shows the elements of the present invention in cross-section. The optical switch according to the present invention has a first GRIN (GRaded INdex) lens 21 associated with an input optical fiber 27, a second GRIN lens 25 associated with an output optic fiber 28, a first wedge-shaped birefringent polarizer 22, a liquid crystal cell 20, and a second wedge-shaped birefringent polarizer 24. The polarizers 20, 24 and the cell 20 are located between the first and second GRIN lens 21 and 25. The angle of the wedge of the polarizers 20 and 24 are complementary to each other so that a light ray entering the first polarizer 21 at a particular angle leaves the second polarizer 24 at the same angle.

In general terms, an optical signal from the input fiber 27 is collimated by the near quarter-pitch GRIN lens 21. The collimated light is split into two polarization modes by the birefringent polarizer 22, passes through the liquid crystal cell 20 and second birefringent polarizer 24, and is recollimated by the second GRIN lens 25, which is also near quarter-pitch. Depending upon the state of the cell 20, the optical signal may, or may not, be transmitted to the output fiber 28. In other words, an optical switch has been described.

Figure 3:
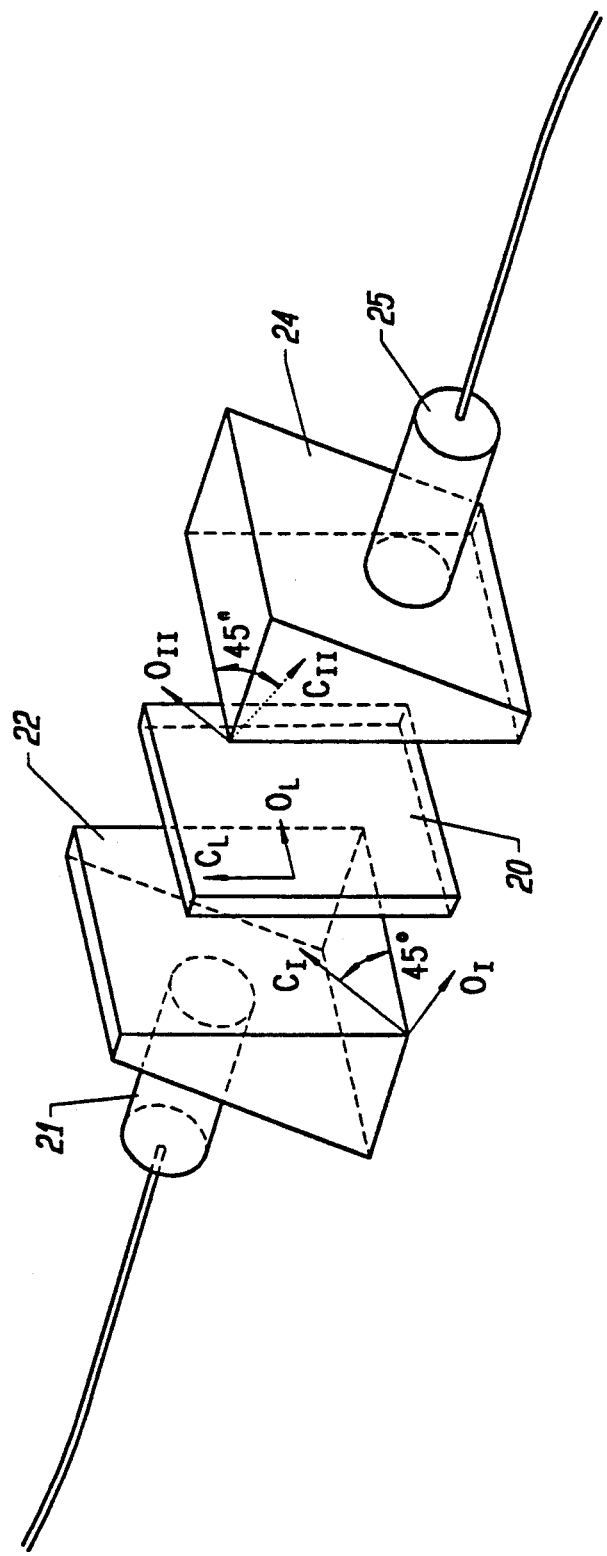
FIG. 3 is a perspective view of the elements of the shutter switch of FIG. 2, particularly the alignment of the optical axes of some of the elements of the switch/attenuator.

By a suitable arrangement of the optical axes of the polarizers 22 and 24, the switch operates independently of any polarization of an incoming optical signal. FIG. 3 illustrates the orientation of the various optical axes of the polarizers 22 and 24 and the liquid crystal cell 20 of FIG. 2. The optical axis of the first polarizer 22, is arranged in an arbitrary direction perpendicular to the line of travel of the collimated light signal from the first GRIN lens 21. The optical axis of the second polarizer 24 is arranged so that it is rotated 90° from the optical axis of the first polarizer 22 and perpendicular to the line of travel of the collimated light beam. When the cell 20 is turned on, the optical axis of the liquid crystal is 45° from the optical axis of the first polarizer 22 and the cell 20 has a thickness such that there is a 180° phase retardation of the light signal as it travels through the cell 20.

Figure 4A:
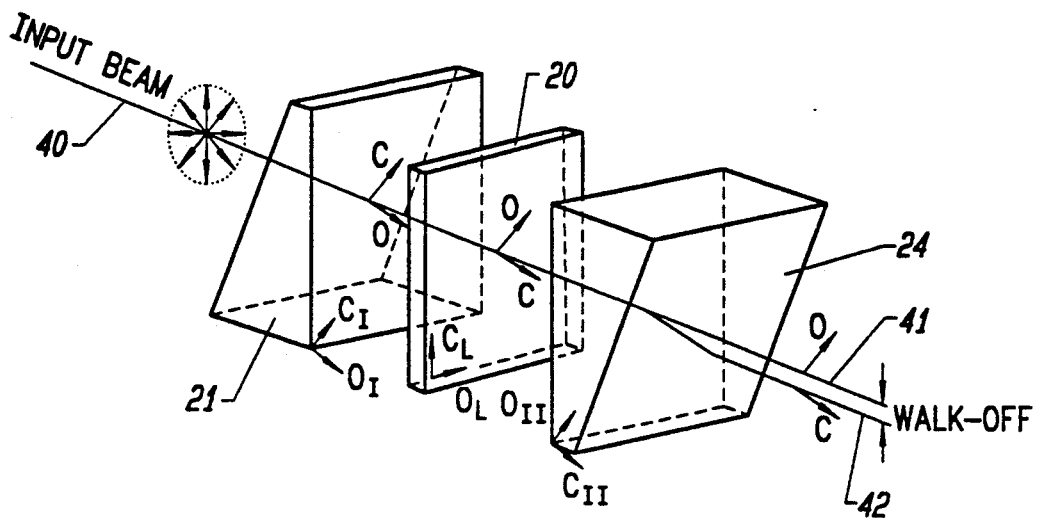
Figure 4B:
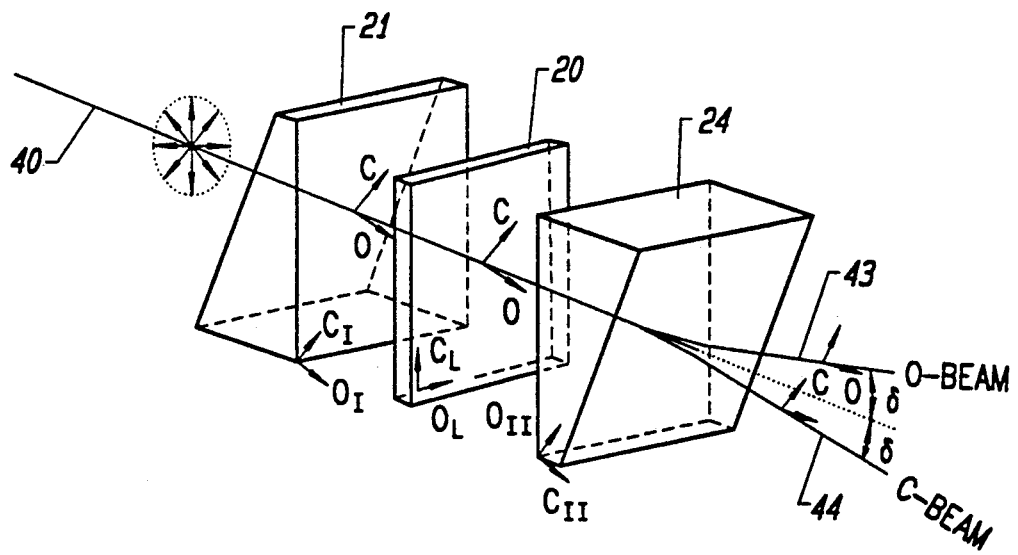
FIG. 4B is a generalized ray tracing of an input optical signal through the first and second polarizers and the liquid crystal cell when the cell is turned off.

Operation of the optical switch according to the present invention is illustrated in FIGS. 4A and 4B. In FIG. 4A, the cell 20 is turned on so that the liquid crystals in the cell are aligned. An incident beam 40 strikes the first birefringent polarizer 21 and is split into the two polarization modes, one for the extraordinary ray and the other for the ordinary ray. With the liquid crystal cell 20 turned on, the light signal is rotated 90°. In other words, the extraordinary light ray is polarized along the axis of the ordinary ray for the first polarizer 21 and the ordinary ray is now polarized along the extraordinary axis of the polarizer 21.

Since the second birefringent polarizer 24 is arranged so that its optical axis is at 90° to the optical axis of the first polarizer 21, the polarization axis of the extraordinary ray from the cell 20 coincides with the extraordinary axis of the second polarizer 24. Likewise, the polarization axis of the ordinary beam coincides with the ordinary axis of the second polarizer 24. The index of refraction for the extraordinary ray is the same for the first and second polarizers. This is true also for the ordinary ray. Thus, the ordinary and extraordinary rays leaving the second polarizer 24 are parallel to the incident beam 40. The second GRIN lens 25 (shown in FIG. 2) combines and recollimates the extraordinary and ordinary rays into the output signal for the output fiber 28 with a very low insertion loss.

FIG. 4B illustrates the operation of the switch when the liquid crystal cell 20 is turned off. As in the previous case, the first polarizer 21 splits the incident light 40 into the two rays with polarization modes along the extraordinary and ordinary axes of the polarizer 21. Since the liquid crystal cell 20 is not turned on, the light from the first polarizer 21 passes through without effect. Since the second polarizer 24 has its optical axis arranged 90° with respect to the optical axis of the first polarizer 21, the extraordinary ray, polarized along the extraordinary axis of the first polarizer 21, coincides with the ordinary axis of the polarizer 24. The ordinary ray, the light polarized along the ordinary axis of polarizer 21, coincides with the extraordinary axis of the second polarizer 24. Thus, each ray has a different refractive index in the first and second polarizers 21 and 24. Therefore, the rays are deflected from the original line of travel from the first GRIN lens 21.

As shown in FIG. 4B, the ordinary ray is deflected from the original line of travel by an angle $\delta$ and the extraordinary ray is deflected from the original line of travel by an angle $\delta$ in the opposite direction. Due to the great sensitivity toward the incident angles on a GRIN lens, acting as a collimator/recollimator, these small deflected angles $\delta$ for both the extraordinary and ordinary beams generate a high attenuation. For example, there is an approximately 50 dB attenuation with a 0.6° deflection angle $\delta$. Thus for all intents and purposes, no light is received by the output fiber 28 from the input fiber 27. The light from the input fiber 27 is blocked from the output fiber 28.

Figure 5A:
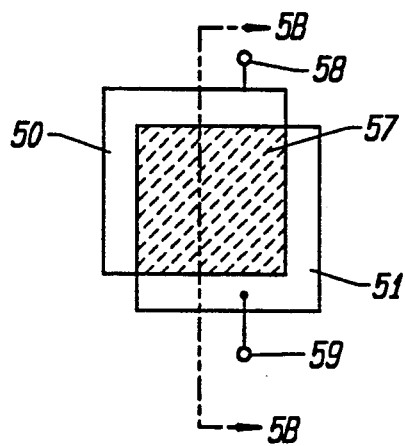
FIG. 5A is a front view of the liquid cell of FIG. 2.
Figure 5B:
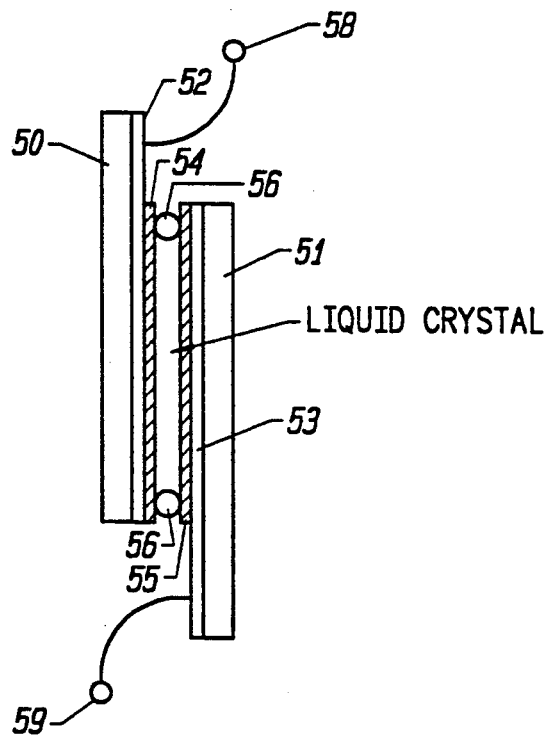
FIG. 5B is a cross-sectional side view of a liquid crystal cell in FIG. 5A.

The liquid cells used in present liquid crystal type switches are used for the cell 20. As indicated in FIG. 2, the surface of the cell 20 facing the first GRIN lens 21 is coated with anti-reflection coating for better performance. FIGS. 5A and 5B show the details of the construction of the liquid crystal cell 20. FIG. 5A shows a front view of the cell 20 with the plate 50 closest to the viewer. The cross-hatched region 57 represents the region of the cell containing the liquid crystal material. A side view of the cell is shown in FIG. 5B indicated by the dotted line 5B—5B in FIG. 5A.

The cell 20 has glass plates 50 and 51, each having a surface facing the other covered respectively with a coating 52 and 53 of indium tin oxide. As shown in the drawings, the plates 50 and 51 are offset from each other to expose some of the coatings 52 and 53, which form transparent electrodes for the cell 20. Insulating layers 54 and 55 of polymer cover the portion of the coatings 52 and 53 which face each other. Polyimides may also be used for the layers 54 and 55. A spacer 56 formed from polystyrene beads between the plates 50 and 51 maintains a precise separation between the plates to form a cavity for the liquid crystal of the cell 20. Beads of 15.8 $\mu$m diameter from Polysciences, Inc. of Warrington, Iowa have been found to work satisfactorily as spacer material. Depending upon the thickness of the spacer 76, fiber rods and thin films of various materials, such as mylar, Kapton, polypropylene and polycarbonate, may also be used for the spacer. UV(ultraviolet light)-cured epoxy binds the spacer 56 to the polymer layers 54 and 55 (and plates 50 and 51).

Since the plates 50 and 51 are not precisely aligned with each other, some portion of the electrically conductive coatings 52 and 53 are exposed. This permits control terminals 58 and 59 to be connected to the coatings, as indicated. Signals on the control terminals 58 and 59 create the electric fields between the coating electrodes for the controlled operation of the cell 20. Signals on the terminals 58 and 59 to create crystal-aligning electric fields in one direction or the other create the "on" and "off" state for the cell 20. Of course, these control signals, while plural, could be rendered into a single control signal by connecting one of the control terminals 58 and 59 to a reference potential, say, ground, and driving the remaining control terminal positive or negative with respect to the grounded terminal. Of note is that the voltages required to align the liquid crystals are low, especially compared to electrooptical crystals, which may require voltages of several hundred volts. These low voltages permit the liquid crystals to be switch at high speeds.

Further details of a high performance liquid crystal cell and its manufacture, which may used for the cell 20, may be found a U.S. government report submitted in April-May 1990 by the present assignee to the National Aeronautics and Space Administration, No. NAS10-11550. The report discloses the performance and manufacture of a liquid crystal cell for a prior art switch as shown in FIG. 1.

For the contents of the cell 20, both nematic and smectic liquid crystals may be used. However, smectic C*-type liquid crystals are preferable. These liquid crystals are ferroelectric, i.e., they are self-polarizing and capable of reorientation with an externally applied electric field. While all liquid crystal cells switch at high speed, it has been found that such ferroelectric liquid crystals can switch approximately a thousand times faster than a nematic liquid crystal. These ferroelectric liquid crystals also have a lower threshold voltage. Thus, even though fabrication and alignment techniques for ferroelectric liquid crystal cells are more complicated that those for nematic liquid crystals, the ferroelectric liquid crystal cells provide for superior performance and advantages.

With a ferroelectric liquid crystal, the cell 20 is never "off" or "on". Rather, in one state the self-polarized crystals are aligned in one direction and, in the other state the crystals are aligned in a second direction. For example, in the optical switch described above, a ferroelectric liquid crystal cell is arranged so that its electrodes align the crystals with the optical axis of the first polarizer 22 in the "off" state and 45° with the optical axis of the polarizer 22 in the "on" state.

For details of the arrangement and construction of the input and output fibers 27 and 28, the first and second GRIN lens 21 and 25, the first and second polarizers 22 and 24, reference should be made to U.S. Ser. No. 07/786,434, noted above and incorporated by reference herein.

The present invention can be adapted to operate as a polarization-independent optical attenuator also. By suitably aligning the axes of the first polarizer 22, second polarizer 25 and the cell 20, the power of the optical signal from the input fiber 27 to the output fiber 28 can be reduced by a predetermined amount. In a sense, a switch is an attenuator in which the attenuation is complete.

One example of an attenuator has the cell 20 responsive to an analog control signal. In response to the strength of the control signal, the optical axis of the liquid crystal is rotated until the light signal from the first polarizer is rotated 90°. Thus the light signal to the output fiber 28 from the input fiber 27 is attentuated directly proportional to the strength of the control signal. At full strength the signal is blocked completely. It is possible to have the control signal operate in a digitized manner so that the signal is attenuated in steps.

A variation of the described switch realigns the axes of the polarizers 22 and 25 with respect to each other. Even when the liquid crystal cell is turned on, not all of the light is blocked. Thus only a predetermined portion of the light, dependent upon the realignment of the axes, is blocked when the cell 20 is turned on. The equivalent effect can be achieved by realigning the optical axis of the liquid crystal when turned on.

Thus, while the above is a complete description of the preferred embodiments of the present invention, various alternatives, modifications and equivalents may be used. It should be evident that the present invention is equally applicable by making appropriate modifications to the embodiment described above. Therefore, the above description should not be taken as limiting the scope of invention which is defined by the metes and bounds of the appended claims.

What is claimed is:

1. An optical device for connection to an input optical fiber and an output optical fiber, said device having at least one control terminal, said device controlling the strength of an optical signal from said input fiber to said output fiber responsive to a signal on said control terminal, said device comprising a first GRIN lens arranged to collimate said optical signal from said input optical fiber;

a first birefringent polarizer having an optical axis perpendicular to a line of travel from collimated optical signal from said first GRIN lens, said first polarizer arranged to split said optical signal from said first GRIN into two polarization modes;

a second birefringent polarizer having an optical axis perpendicular to said line of travel from collimated optical signal from said first GRIN lens and offset from said optical axis of said first polarizer by a predetermined angle;

a second GRIN lens arranged to recollimate said optical signal from said second polarizer to said output fiber; and means, disposed between said first and second polarizers and connected to said control terminal, for controllably rotating said optical signal from said optical axis of said first polarizer toward said optical axis of said second polarizer responsive to said signal on said control terminal;

whereby performance of said device is independent of polarization of said optical signal in said input fiber.

2. The optical device of claim 1 wherein said rotating means comprises a liquid crystal cell.

3. The optical device of claim 2 wherein said liquid crystal cell comprises smectic liquid crystal.

4. The optical device of claim 3 wherein said smectic liquid crystal is ferroelectric.

5. The optical device of claim 2 wherein said liquid crystal cell comprises nematic liquid crystal.

6. The optical device of claim 1 wherein said control signal has two states, one state corresponding to a full rotation of said optical signal from said optical axis of said first polarizer toward said optical axis of said second polarizer, the other state corresponding to no rotation of said optical signal from said optical axis of said first polarizer toward said optical axis of said second polarizer, whereby said device operates as an optical switch.

7. The optical device of claim 6 wherein said predetermined angle is 90 degrees whereby said optical signal may be switched fully off and on.

8. The optical device of claim 1 wherein the amount of rotation of said optical signal from said optical axis of said first polarizer toward said optical axis of said second polarizer corresponding to the strength of said control signal, whereby said device operates as an optical attenuator.

9. The optical device of claim 8 wherein said predetermined angle is 90 degrees whereby said optical signal may be attentuated completely.

10. The optical device of claim 2 wherein said first and second polarizers comprise lithium niobate.

11. An optical device for connection to an input optical fiber and an output optical fiber, said device having at least one control terminal, said device controlling the strength of an optical signal from said input fiber to said output fiber responsive to a signal on said control terminal, said device comprising a first GRIN lens arranged to collimate said optical signal from said input optical fiber;

a first birefringent lithium niobate polarizer having an optical axis perpendicular to a line of travel from collimated optical signal from said first GRIN lens, said first polarizer arranged to split said optical signal from said first GRIN into two polarization modes;

a second birefringent lithium niobate polarizer having an optical axis perpendicular to said line of travel from collimated optical signal from said first GRIN lens and offset from said optical axis of said first polarizer by a predetermined angle;

a second GRIN lens arranged to recollimate said optical signal from said second polarizer to said output fiber; and a liquid crystal cell, disposed between said first and second polarizers and connected to said control terminal, for controllably rotating said optical signal from said optical axis of said first polarizer toward said optical axis of said second polarizer responsive to said signal on said control terminal;

whereby performance of said device is independent of polarization of said optical signal in said input fiber.

12. The optical device of claim 11 wherein said control signal has two states, one state corresponding to a full rotation of said optical signal from said optical axis of said first polarizer toward said optical axis of said second polarizer, the other state corresponding to no rotation of said optical signal from said optical axis of said first polarizer toward said optical axis of said second polarizer, whereby said device operates as an optical switch.

13. The optical device of claim 12 wherein said predetermined angle is 90 degrees whereby said optical signal may be switched fully off and on.

14. The optical device of claim 12 wherein said liquid crystal cell comprises smectic liquid crystal.

15. The optical device of claim 14 wherein said smectic liquid crystal is ferroelectric.

16. The optical device of claim 12 wherein said liquid crystal cell comprises nematic liquid crystal.

17. The optical device of claim 11 wherein the amount of rotation of said optical signal from said optical axis of said first polarizer toward said optical axis of said second polarizer corresponding to the strength of said control signal, whereby said device operates as an optical attenuator.

18. The optical device of claim 17 wherein said predetermined angle is 90 degrees whereby said optical signal may be attentuated completely.

19. The optical device of claim 17 wherein said liquid crystal cell comprises smectic liquid crystal.

20. The optical device of claim 19 wherein said smectic liquid crystal is ferroelectric.

21. The optical device of claim 17 wherein said liquid crystal cell comprises nematic liquid crystal.

* * * * *